(12) United States Patent
Cordiner

(10) Patent No.: US 6,797,749 B1
(45) Date of Patent: Sep. 28, 2004

(54) POWDER COATING COMPOSITIONS

(75) Inventor: Andrew George Cordiner, Gateshead (GB)

(73) Assignee: International Coatings Limited (GB)

( * ) Notice: Subject to any disclaimer, the term of this patent is extended or adjusted under 35 U.S.C. 154(b) by 0 days.

(21) Appl. No.: 09/936,016

(22) PCT Filed: Mar. 9, 2000

(86) PCT No.: PCT/GB00/00871

§ 371 (c)(1),
(2), (4) Date: Dec. 11, 2001

(87) PCT Pub. No.: WO00/53684

PCT Pub. Date: Sep. 14, 2000

(30) Foreign Application Priority Data

Mar. 10, 1999 (GB) .............................................. 9905522

(51) Int. Cl.$^7$ .............................. C09D 5/29; C08J 3/22; C08K 3/34; C08L 67/00; B32B 27/06
(52) U.S. Cl. ....................... 523/171; 523/351; 524/449; 524/599; 524/904; 525/385; 525/934; 428/482
(58) Field of Search .................................. 524/449, 599, 524/904; 523/171, 351; 525/385, 934; 428/482

(56) References Cited

U.S. PATENT DOCUMENTS

| | | | | |
|---|---|---|---|---|
| 5,319,001 A | * | 6/1994 | Morgan et al. | 523/205 |
| 5,855,965 A | | 1/1999 | Molerus et al. | 427/475 |
| 5,856,378 A | | 1/1999 | Ring et al. | 523/205 |
| 6,027,814 A | | 2/2000 | Julien et al. | 428/425.8 |
| 6,130,281 A | * | 10/2000 | Seo et al. | 524/425 |
| 6,146,145 A | * | 11/2000 | Itakura et al. | 434/93 |

FOREIGN PATENT DOCUMENTS

| | | |
|---|---|---|
| EP | 372 860 | 6/1990 |
| EP | 0 459 048 A | 12/1991 |
| JP | 62 270672 A | 11/1987 |
| WO | WO 94/11446 | 5/1994 |

* cited by examiner

*Primary Examiner*—Tae H. Yoon
(74) *Attorney, Agent, or Firm*—Proskauer Rose LLP; Tiffany A. Levato; Kristin H. Neuman

(57) ABSTRACT

The invention provides a powder coating composition in which powder particles are an agglomerate of individual particulate components fused or bonded together into composite particles. Maximizing the amount of larger-sized uncolored component(s) gives cost advantages, and the invention allows a rapid and flexible manufacture of a range of colored powder coating compositions.

68 Claims, No Drawings ously <30% gloss), is achieved

POWDER COATING COMPOSITIONS

FIELD OF THE INVENTION

This invention relates to powder coating compositions and to their use.

Powder coating compositions generally comprise a solid film-forming resin, usually with one or more colouring agents such as pigments, and optionally they also contain one or more performance additives. They are usually thermosetting, incorporating, for example, a film-forming polymer and a corresponding curing agent (which may itself be another film-forming polymer).

The compositions are generally prepared by intimately mixing the ingredients (including any colouring agents and performance additives) for example in an extruder, at a temperature above the softening point of the film-forming polymer(s) but below a temperature at which significant pre-reaction would occur. The extrudate is usually rolled into a flat sheet and comminuted, for example by grinding to the desired particle sizes ("micronising"). The size distribution required for most commercial electrostatic spray apparatus is up to 120 microns, often between 10 and 120 microns, with a Dv.50 within the range of 15 to 75 microns, preferably 25 to 50 microns, or more especially 20 to 45 microns.

BACKGROUND TO THE INVENTION

Currently, powder coating manufacturing methods allow the manufacturer to offer commercially a range of full gloss coatings in a variety of colours. The range of products available in reduced-gloss finishes is, however, limited.

Reduction of gloss to some other lower level, for example satin gloss (55–65% gloss) or matt (<30% gloss), is achieved by creating a surface which is rough on a microscopic scale. This may be achieved by using incompatible components or components that generate incompatibility. For example, an acrylic component and a polyester, epoxy, polyester-epoxy or polyurethane component are incompatible, and cannot be blended to form a single (stable) phase. Incompatibility during film formation can also be achieved by using components that are initially miscible (compatible) but that become incompatible during curing. Thus, for example, two systems of similar chemistry and approximately the same gel time are compatible, but components with different gel times are initially compatible but become incompatible as curing (and molecular weight build-up) proceeds. Thus, gloss-reducing agents include a second catalyst which will give a much faster gel time than the principal catalyst used to cure the film. Alternatively, with acid-functional polyesters, for example, a fast gelling (reacting) powder and a slow gelling powder may be manufactured separately using polyesters of different functionality, and mixed after the micronising stage or, more usually, the components are mixed prior to micronising; the components should have the same colour and particle size. Production of small batches of reduced-gloss coating composition, however, is uneconomic. A different method utilises a product called 'gloss killer', available from the company Tiger, which is mixed in after the micronising stage. However, this product, a clear (uncoloured) powder coating, can be added only in limited amounts to a conventional coloured powder coating before the presence of the gloss killer can be detected from the sparkle generated by the particles of the dear gloss killer powder in the film. Therefore the product is limited to adjusting gloss by a few percentage points.

There is accordingly a need for powder coating compositions in a wide range of reduced-gloss finishes, which avoid the problems mentioned above.

Speed of delivery to customers is also an important consideration, but the conventional powder coatings manufacturing method relies on premixing, extrusion and milling as separate processes, causing turnaround times to be long, and production of small batches of a product is again not economic. Stocking large product ranges solves the problem of speed of delivery, but is a highly inflexible approach and is not cost-effective.

EP 372860 A describes a colour mixing process for powder coatings in which sufficiently small-sized particles (<20 $\mu$m in size and advantageously <10 $\mu$m) are used that mixed colours applied to a substrate have a homogeneous appearance. Before application to the substrate the mixture is generally subjected to a process of agglomeration in which the small-sized particles are fused or bonded into composite particles, for example by mechanofusion, to convert the mixture from a cohesive mass to a free-flowing and fluidisable powder, which can be applied by conventional means. Thus, a range of basic coloured powder coating compositions is produced, conventionally, in a conventional melt extrusion step, and the products are comminuted to a distinctively small particle size. A range of other colours can then be produced by mixing and agglomerating these coloured powder bases in the desired proportions. This allows the storage of comparatively few basic coloured powder bases, which can be mixed and agglomerated to produce any desired shade easily on demand, and the production of small quantities becomes commercially feasible.

An extension of this agglomeration technique for the flexible production of a range of coloured powder coatings with a range of different reduced-gloss and other aesthetic effects is described in EP 539385 A.

Gloss reduction is achieved, for example, by adding uncoloured incompatible particles of mean particle size <5 $\mu$m, or initially compatible particles of mean particle size <20 $\mu$m of a polymer having a different functionality from the polymer of the main film-forming component. Amounts of the gloss-reducing agent are, for example, 5 or 10% by weight, although amounts up to 40% by weight are also disclosed.

SUMMARY OF THE INVENTION

The present invention provides a powder coating composition in which powder particles are an agglomerate of individual particulate components fused or bonded together into composite particles, wherein the individual particulate components comprise (1) one or more coloured film-forming base components having a Dv.99 of no more than 30 $\mu$m, and (2) one or more uncoloured film-forming components, wherein at least one component (2a)

(i) has a Dv.99 that is more than 20 $\mu$m and (ii) has a higher Dv.99 or higher Dv.50 than component (1) or, when there is more than one such component, than those components taken together, the ratio of coloured film-forming base component(s) to uncoloured film-forming component(s) in the composition being in the range of from 1:99 to 60:40 by weight.

As will be understood in the art, the volume percentiles Dv.x indicate for a stated particle size (D) the percentage (x) of the total volume of the particles that lies below the stated particle size; the percentage (100−x) of the total volume lies at or above the stated size. Thus, for instance, Dv.50 is the median particle size of the sample, and on a particle size distribution graph Dv.99 is the point on the curve read along the particle size axis where the area under the curve below this particle size represents 99% by volume of the particles. Thus, Dv.99=30 μm indicates that 99% of the particles are below 30 μm (but are not below 29 μm). (For the avoidance of doubt, it should be noted that all particle sizes quoted herein are by volume.) Volume percentiles are measurable by laser diffraction techniques, for example by the Malvern Mastersizer.

Surprisingly, even with a high proportion of uncoloured component of significantly larger particle size than the coloured base components (whether judged according to Dv.99 or according to Dv.50), nevertheless the particles of the larger-sized component are not visible to the naked eye, so that the composition gives the appearance of a single colour.

A coloured base component comprises colouring material and film-forming polymer. Thus, for example, it may be constituted as a powder coating composition in its own right, containing the usual powder coating additives, but having the specified (reduced) particle size. Usually there will be at least two coloured base components in the composition, each having a Dv.99 of no more than 30 μm.

An uncoloured film-forming component is usually also a powder coating composition in its own right, but having the specified particle size; there should be at least one uncoloured film-forming component having a higher Dv.99 and/or a higher Dv.50 than a coloured film-forming base component. (Usually, a component having a higher Dv.99 than another will also have a higher Dv.50 and vice-versa) Usually, there are two or more coloured film-forming base components each having a Dv.99 of no more than 30 μm and at least one uncoloured film-forming component having a Dv.99 that is more than 20 μm and that is higher than the Dv.99 of the coloured film-forming base components taken together (or having a Dv.99>20 μm and a Dv.50 that is higher than the Dv.50 of the coloured film-forming base components taken together). Very often that uncoloured film-forming component will have a higher Dv.99 (or a higher Dv.50) than each coloured film-forming base component. Preferably the uncoloured film-forming component has a Dv.99 of at least 40 μm, for example at least 50 μm, or more than 55 μm, e.g. in the range of from 50 to 65 μm. Preferably it will have a Dv.90 of no more than 75 μm and advantageously will have a Dv.50 of at least 8 μm, especially in the range of from 12 to 30 μm. Such uncoloured film-forming components have the advantage of lower manufacturing cost in relation to the small-sized coloured components and their use allows easy adjustment of the polymer/pigment ratio in the composition.

The present invention also provides a kit comprising the following separate components for agglomerating into powder coating compositions for the preparation of powder coatings in a number of different finishes:

a plurality of coloured film-forming base components, each with a Dv.99 of no more than 30 μm, and one or more uncoloured film-forming components, at least one having a higher Dv.99 or Dv.50 than each of the coloured film-forming components, and a Dv.99 that is more than 20 μm, preferably more than 40 μm and preferably no more than 90 μm.

Such kits allow a rapid and flexible manufacture of a range of coloured powder coating compositions, reduced-gloss finishes being manufactured by the use of an uncoloured component that is incompatible with the coloured base component or that becomes incompatible therewith during film-formation.

The present invention also provides a powder coating composition comprising a non-agglomerated mixture of the individual particulate components specified above in the specified proportions.

DETAILED DESCRIPTION OF THE INVENTION AND DESCRIPTION OF PREFERRED EMBODIMENTS

The individual particulate components may comprise, for example.

(1) one or more, usually two or more, coloured film-forming base components each having a Dv.99 of no more than 30 μm, in an amount of from 1 to 60% by weight of the total film-forming components, and (2)(a) one or more uncoloured film-forming components each having a Dv.99 of more than 20 μm and each having a higher Dv.99 (or a higher Dv.50) than the coloured film-forming base component (1) or, when there is more than one such component, than those components taken together, in an amount of from 10 to 99% by weight of the total film-forming components, and, if desired, (b) one or more other uncoloured film-forming components, in an amount of up to 30% by weight of the total film-forming components, Where there is one uncoloured film-forming component (2a) this preferably has a Dv.99 of up to 90 μm, and where there are two or more uncoloured film-forming components (2a) preferably at least one, and often all, such components have a Dv.99 of up to 90 μm.

More especially, the present invention provides a powder coating composition, suitable for providing a coating having certain appearance or performance attributes, which comprises composite particles formed by the agglomeration of individual particulate components fused or bonded together into composite particles such that the composite particles are air-fluidisable and can be applied to a substrate by electrostatic spray without causing the individual particles in the composite particles to break down under the mechanical and/or electrostatic forces associated with their application to a substrate, wherein the individual particulate components comprise (1) one or more, usually two or more, coloured film-forming base components each having a Dv.99 of no more than 30 μm and (2)(a) one or more uncoloured film-forming components each having a Dv.99 of more than 20 μm and each having a higher Dv.99 or Dv.50 than the coloured film-forming base component (1) or, when there is more than one such component, than those components taken together, and, if desired, (b) one or more other uncoloured film-forming components, the ratio of coloured film-forming base component(s) to uncoloured film-forming component(s) in the composition being in the range of from 1:99 to 60:40 by weight, each particle of each film-forming component comprising a solid polymeric binder system at least a portion of which is a film-forming resin, the resin in the composition being in an amount sufficient to impart film-forming properties to the composition.

Ratios of coloured film-forming component(s) to uncoloured film-forming component(s) in the composition of from 1:99, e.g. from 2:98, preferably from 5:95, and up to 60:40, e.g. no more than 50:50, advantageously no more than 40:60 and preferably no more than 30:70, should especially be mentioned.

Advantageously, the minimum weight of uncoloured film-forming component(s) (2a) corresponds to a ratio of coloured film-forming base component(s) (1) to uncoloured film-forming component(s) (2a) of 5:2. Preferably the weight of uncoloured film-forming component(s) (2a) is at least that of coloured film-forming component(s) (1) and, preferably, the weight of uncoloured film-forming component(s) (2a) is at least that of other uncoloured film-forming component(s). Preferably the weight of uncoloured film-forming component(s) (2a) is at least that of other film-forming component(s) (1) and (2b) together.

In one embodiment, the uncoloured film-forming component(s) (2a) have a Dv.99 of more than 20 μm and up to 40 μm, the ratio of coloured film-forming base component(s) to uncoloured film-forming component(s) in the composition being in the range of from 1:99 to 30:70, for example from 2:98 to 30:70, by weight.

In another embodiment, the uncoloured film-forming component(s) have a Dv.99 of more than 40 μm and preferably no more than 90 μm, the ratio of coloured film-forming base component(s) to uncoloured film-forming component(s) in the composition being in the range of from 1:99 to 60:40, for example from 2:98 to 30:70, by weight.

Thus, the coloured film-forming base component(s) (1) may be, for example, at least 2%, for example at least 5%, and, for example, no more than 50%, advantageously no more than 40% and preferably no more than 30%, by weight of the total film-forming components. A content of coloured film-forming base component(s) of no more than 20%, for example from 10 to 20%, by weight of the total film-forming components should especially be mentioned.

The uncoloured film-forming component(s) (2) may be, for example, at least 10%, preferably at least 20%, more preferably at least 30%, especially at least 40%, more especially at least 50%, advantageously at least 60%, for example at least 70%, and, for example, up to 95%, by weight of the total film-forming components. A content of uncoloured film-forming component(s) of up to 90%, for example from 80 to 90%, by weight of the total film-forming components should be mentioned.

The uncoloured film-forming component(s) (2a) may be, for example, at least 10%, preferably at least 20%, more preferably at least 30%, especially at least 40%, more especially at least 50%, advantageously at least 60%, for example at least 70%, and for example up to 95%, by weight of the total film-forming components.

Where the composition also includes, as particulate component in the agglomerate, a further uncoloured film-forming component (component (2b)), there may, for example, be no more than 30% by weight, calculated on all of the film-forming components together, of component(s) (2b) having (i) a Dv.99 that is $\leq 20$ μm, and (ii) a Dv.99 (or Dv.50) that is no higher than the Dv.99 (or Dv.50 respectively) of the coloured film-forming component or of all the coloured film-forming components in the composition taken together. A content of uncoloured film-forming component(s) (2b) of no more than 15%, for example 10% by weight or less, calculated on the weight of the total film-forming components should especially be mentioned.

In comparison with agglomerated coloured powder coating compositions described in EP 372860 A and EP 539385 A, compositions of the present invention contain a high proportion of uncoloured film-forming component, and the individual coloured components necessarily contain a significantly higher content of pigment. Moreover, the particle size of the uncoloured particles in component(s) (2a) can be significantly larger than those of the coloured base component(s), without, surprisingly, affecting visual homogeneity. Thus, contrary to expectation and contrary to the suggestions in EP 372860 A and EP 539385 A, powders containing significant quantities of uncoloured component (s) having, for example, a Dv.99>40 μm can be used to produce powder coating films in which the differences between the coloured particles and the uncoloured particles are not discernable by the unaided human eye. Maximising the level of larger-sized uncoloured component(s) will give cost advantages.

If desired, the composition may include as particulate component in the agglomerate as well as coloured film-forming base component(s) (1) and uncoloured film-forming component(s) (2a) and optionally (2b), one or more non-film-forming components, e.g. a texturing agent, a metallic or mica pigment, or a non-film-forming performance component. If desired, a non-film-forming component may be pre-mixed with a film-forming component, e.g. with an uncoloured film-forming component, to form a masterbatch before mixing with the remaining components and then agglomerating. Alternatively, for example, a non-film-forming additive may be mixed with an uncoloured film-forming composition in an extruder and then micronised, to give an uncoloured film-forming component (2a) or (2b), depending on particle size, that also contains the desired aesthetic or performance additive.

A film-forming particulate component for inclusion in the agglomerate may itself be in the form of an agglomerate. Usually such a component would be formed by agglomeration of an uncoloured film-forming component with a non-film-forming component, for example a texturing additive or metallic or mica pigment.

Each film-forming component of the composition comprises at least one solid film-forming resin and includes any curing agent required therefor, and is usually formed by an extrusion process and comminution to the requisite particle size. Where a film-forming component is coloured, the colouring agent or agents (pigments and/or dyes) is (are) generally extruded with the film-forming resin(s), plus any curing agent, so that particles formed therefrom comprise film-forming resin, colouring agent and, where applicable, curing agent.

Reduction of gloss, for example to satin gloss (55–65% gloss) or matt (<30% gloss) or some other level, may be achieved by creating a surface which is rough on a microscopic scale using incompatible components or components that generate incompatibility. Film-forming components of similar chemistry but different gel times provide incompatibility during film-formation, and reduction in gloss may be achieved by such means. Usually two (or more) film-forming base components are compatible with each other, but there may be an incompatible uncoloured film-forming component present. For example, there may be an uncoloured film-forming component having a different functionality from the coloured film-forming base component(s) and optionally also containing a different catalyst (both of which lead to different gel times). For example, coloured and uncoloured components may be based on polyesters of different functionality. For polyurethane systems using hydroxy-functional polyesters cured with an isocyanate (typically isopherone diisocyanate), hydroxy-functional polyesters with radically different functionality may be used, e.g. a hydroxy-functional polyester with a functionality of 7 for an uncoloured component and one with a functionality of 2 used for the coloured base component(s). Another possibility is to employ polymeric materials that are per se incompatible with each other, for example a polyester and an acrylic polymer.

In contrast to conventional prior art gloss-reduction processes, which generally use 50:50 non-fused mixtures of same-sized powders, with fused or bonded compositions of the present invention good gloss reduction can be achieved with substantially different proportions of gloss-reducing additive. The agglomerated material also does not suffer from particle segregation in the solid state as would dry-blended product thus giving uniformity of product even after transportation and spraying.

Thus, uncoloured components can be used for extension of product ranges, to give different finishes. Also, by using different chemistries, they may be used to give different performance characteristics. The different chemistries may arise, for example, from the use of different film-forming polymers, e.g. polyester and acrylic or polyester and epoxy, but may also arise from the use of different curing agents, e.g. polyester with an epoxy curing agent in one component and polyester with a bis(beta-hydroxyalkylamide) curing agent such as PRIMID in another component.

In addition, or alternatively, an uncoloured film-forming component of the composition of the present invention may be compatible with the coloured film-forming base component(s). Usually all the coloured film-forming base components are compatible with one another.

An uncoloured film-forming component of a kit of the invention may be a pre-prepared uncoloured coating composition of the specified particle size or one of conventional size which is reduced in size just prior to use. Advantageously, for any particular type of film-forming chemistry (e.g. acid-functional polyester, hydroxy-functional polyester), a kit of the invention includes a "universal" gloss-reducing component suitable for all powder coating compositions of that chemistry. The present invention has the advantage of reducing costs while also reducing stocking levels and manufacturing capacity. It enables a very rapid and flexible service to be provided cheaply to the customer, allowing for the possibility of providing small quantities of powder coating compositions economically on request.

Advantageously, the coloured film-forming base components taken together contain at least 5%, e.g. at least 10%, and generally no more than 70% or 75%, e.g. no more than 60%, for example 20 to 40%, by weight of pigment, calculated on the total weight of these components. Advantageously, each contains at least 8% by weight of pigment, calculated on the weight of that component. The number of coloured film-forming base components in a kit may be, for example, at least 7, e.g. in the range of from 7 to 30.

Examples of pigments which may be used in the coloured base components are inorganic pigments, such as, for example, titanium dioxide white, red and yellow iron oxides, chrome pigments and carbon black, and organic pigments such as, for example, phthalocyanine, azo, anthraquinone, thioindigo, isodibenzanthrone, triphendioxane and quinacridone pigments, vat dye pigments and lakes of add, basic and mordant dyestuffs. Dyes may be used instead of or as well as pigments. Each coloured base component of the coating composition may contain a single colorant (pigment or dye) or may contain more than one colorant. Where appropriate, a filler may be used to assist opacity, whilst minimising costs.

Additional pigment may alternatively be added as a separate component prior to agglomerating, especially if the pigment is close in colour to the mixed coloured film-forming base components. Any pigment added in this way would generally be no more than 3%, preferably up to 1%, by weight, based on the weight of the total composition, although amounts up to 5% may also be possible. Thus, for example, pigment in an amount of no more than 3% by weight, more especially up to 1% by weight, may be used to displace the colour of the components over a small colour region, this being used for colour tinting or colour correction of a batch.

Preferably, the total weight of pigment in the composition is at least 0.5%, more especially at least 5%, and preferably no more than 30%, although an amount up to 50% is potentially also possible.

One or more other separate components (3) may also be present. Other optional components include, for example, performance and aesthetic additives mentioned in EP 539385 A. Those components may, if desired, be pre-mixed with another component, for example an uncoloured film-forming component, with the components remaining as distinct components, e.g. (2a) and (3), before final agglomeration. Alternatively, the additives may be combined in a masterbatch with uncoloured film-forming polymer, often itself constituted as a powder coating composition in its own right, the masterbatch being prepared, for example. by co-extrusion of polymer and additive, followed by comminution, or by agglomeration of the particulate additive with uncoloured film-forming powder, to form uncoloured film-forming component (2a) or (2b), often (2a). Such further aesthetics additives may be present for example in an amount of from 0.5 to 50% by weight of the total composition. A non-film-forming performance additive is generally present in an amount of no more than 5% by weight of the composition, e.g. in an amount of from 0.5 to 5% by weight. Where other component(s) are present in a composition of the present invention, the percentages of the specified coloured film-forming base component(s) and/or the specified uncoloured film-forming component(s) in the composition may be altered accordingly, but the ratio of coloured film-forming base component(s) to uncoloured film-forming component(s) will generally remain the same.

A composition of the present invention may contain, for example, at least 1%, e.g. at least 2%, often at least 5%, by weight of the specified coloured film-forming base component(s). Often the composition will contain at least 20%, e.g. at least 30% or at least 40%, by weight of the uncoloured film-forming component (2a) of the size specified above. Preferably, the content of uncoloured film-forming component(s) in the composition is at least 40%, e.g. at least 50%, and advantageously at least 60%, and preferably at least 70%, by weight. Amounts of at least 40% e.g. at least 50%, and advantageously at least 60%, and preferably at least 70%, by weight of uncoloured film-forming component(s) (2a) of the size specified above should especially be mentioned.

Ratios of from 1:99, e.g. from 2:98, preferably from 5:95, and up to 60:40, e.g. up to 50:50, advantageously up to 40:60 and preferably up to 30:70 for the ratio of coloured film-forming base component(s) (1) to uncoloured film-forming component(s) of the specified size (2a) should especially be mentioned.

Preferably, in each of the coloured film-forming base components all the component particles are <25 $\mu$m. Advantageously the coloured film-forming base components have at least 90% by volume of particles <20 microns, more especially at least 90% by volume <10 microns, and advantageously the components have a Dv.99 of at least 6 μm, advantageously up to 25 μm. Advantageously, the Dv.50 of each such component is up to 18 μm, preferably up to 15 μm, e.g. up to 12 μm, advantageously at least 2 μm, for example within the range of for example 2 to 8 μm, preferably 2 to 6 μm or 8 to 12 μm; Dv.50 values ≧2 μm and ≦5 μm should especially be mentioned.

A coloured film-forming base component of a kit of the invention may, however, be of larger particle size and then reduced in size just prior to use. Accordingly, the present invention also provides a kit comprising the following separate components for agglomerating into powder coating compositions for the preparation of powder coatings in a number of different colours:

at least 7 differently coloured film-forming base components, an uncoloured film-forming component that is compatible with the coloured film-forming base components and remains compatible therewith during film-formation and that has a Dv.99 of more than 40 μm and preferably of no more than 90 μm, and an uncoloured film-forming component that is incompatible with the coloured film-forming base components or that becomes incompatible therewith during film-formation and that has a Dv.99 of more than 40 μm and preferably of no more than 90 μm.

In one embodiment of the present invention, the individual particulate components of the powder coating composition comprise two or more coloured film-forming base components having a Dv.99 of no more than 30 μm, and one or more uncoloured film-forming components, at least one component having a higher Dv.99 or higher Dv.50 than at least one, preferably all, of the coloured film-forming base component(s), and having a Dv.99 of more than 20 μm and preferably no more than 90 μm, the ratio of coloured film-forming base components to uncoloured film-forming component(s) of the specified size being in the range of from 1:99 to 30:70 by weight.

In a further embodiment of the present invention, the individual particulate components of the powder coating composition comprise two or more coloured film-forming base components having a Dv.99 of no more than 30 μm, and one or more uncoloured film-forming components, at least one component having a Dv.99 of more than 40 μm and preferably no more than 90 μm, the ratio of coloured film-forming base components to uncoloured film-forming component(s) of the specified size being in the range of from 1:99 to 60:40 by weight.

Preferably, the uncoloured film-forming component (2a) or at least one, and advantageously each, of the uncoloured film-forming components (2a) has a Dv.99 of at least 30 μm, more especially at least 35 μm, and advantageously at least 40 μm. An uncoloured film-forming component having a Dv.50 of at least 8 μm and up to 35 μm, e.g. up to 30 μm, and/or having a Dv.90 of at least 14 μm should especially be mentioned. An uncoloured film-forming component (2a) having a Dv.50 of at least 10 μm and up to 35 μm, e.g. in the range of from 12 to 30 μm, and/or having a Dv.90 of at least 18 μm and one having a Dv.90 of no more than 75 μm should also especially be mentioned.

Uncoloured component(s) (2a) may, for example, have a Dv.99 or a Dv.50 that is at least twice, e.g. at least three times, the Dv.99 or Dv.50 figure of the coloured component (s) (1) taken together. For example, the Dv.99 of component (s) (2a) may be at least 20 μm, e.g. at least 30 μm, more than that of component or components (1) taken together.

A powder coating composition of the invention will in general be a thermosetting system, although thermoplastic systems (based, for example, on polyamides) can in principle be used instead.

When a thermosetting resin is used, the solid polymeric binder system generally includes a solid curing agent for the thermosetting resin; alternatively two co-reactive film-forming thermosetting resins may be used. Thus, a thermosetting powder coating composition according to the invention may contain one or more film-forming polymers selected from carboxy-functional polyester resins, hydroxy-functional polyester resins, epoxy resins, and functional acrylic resins. Carboxy-functional polyester resins should especially be mentioned.

A carboxy-functional polyester film-forming resin may be used, for example, with a polyepoxide curing agent. Such carboxy-functional polyester systems are currently the most widely used powder coatings materials. The polyester generally has an acid value in the range 10–100, a number average molecular weight Mn of 1,500 to 10,000 and a glass transition temperature Tg of from 30° C. to 85° C., preferably at least 40° C. The poly-epoxide can, for example, be a low molecular weight epoxy compound such as triglycidyl isocyanurate (TGIC), a compound such as diglycidyl terephthalate condensed glycidyl ether of bisphenol A or a light-stable epoxy resin. Such a carboxy-functional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehye resin, or a glycol ural formaldehye resin, for example the material "Powderlink 1174" supplied by the Cyanamid Company, or hexahydroxymethyl melamine. A blocked isocyanate curing agent for a hydroxy-functional polyester may, for example, be internally blocked, such as the uret dione type, or may be of the caprolactam-blocked type, for example isopherone diisocyanate.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin can be used with an appropriate curing agent.

Mixtures of film-forming polymers can be used; for example a carboxy-functional polyester can be used with a carboxy-functional acrylic resin and a curing agent such as a bis(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

The function of coatings is of course protective, but appearance is also important, and the film-forming resin and other ingredients are selected so as to provide the desired performance and appearance characteristics. In relation to performance, coatings should generally be durable and exhibit good weatherability, stain or dirt resistance, chemical or solvent resistance and/or corrosion resistance, as well as good mechanical properties, e.g. hardness, flexibility or resistance to mechanical impact; the precise characteristics required will depend on the intended use. The composition must, of course, be capable of forming a coherent film on the substrate, and good flow and levelling of the composition on the substrate are required. Accordingly, the powder coating composition generally also contains one or more performance additives such as, for example, a flow-promoting agent, a plasticiser, a stabiliser, for example a stabiliser against UV degradation, an anti-gassing agent, such as benzoin, or a filler. Such additives are known and standard additives for use in powder coating compositions. Usually, these performance additives will be incorporated in any film-forming component before and/or during the extrusion or other homogenisation process, although, if appropriate, any such additive may alternatively be incorporated as a separate component in the agglomeration process.

Mixing and agglomeration methods are described in EP 372860 A and EP 539385 A.

The agglomerate may, for example, be prepared by mechanofusion of a mixture of the individual components, for example by mechanofusion at a temperature in the range of from 60 to 80° C., or by granulation using methanol or other suitable solvent as granulating agent, to produce composite particles that constitute a free-flowing and fluidisable powder.

Good fluidity of the powder is required for purposes of application to the substrate. This fluidity of powders is governed by their particle size, and particle size also controls the application efficiency of a powder; powders with small particles, i.e. significant quantities <10 microns, more especially <5 microns, exhibit poor fluidity and application characteristics.

The present invention also provides a process for the preparation of a powder coating composition of the present invention, which comprises providing, in the specified proportions, the specified one or more coloured film-forming base components and the one or more specified uncoloured film-forming components, and if desired one or more other uncoloured film-forming components and/or one or more non-film-forming components, and mixing and agglomerating the components such that the composition is air-fluidisable and can be applied to a substrate by electrostatic spray.

Agglomeration prevents segregation of the constituents during application and handling, which otherwise would occur, for example during the application process itself (because of differential electrostatic charging) or in the attendant recovery and recycling process (because of differences in particle size and/or particle density) or in transport, causing batch-to-batch variability in the resulting coating.

The composite particles produced may be likened to raspberries with the individual particles of the raspberry (the drupels) bonded to one another, although the "drupels" are of different sizes, and there will of course also be "raspberries" of different composition and different sizes in the powder as a whole. Inspection of a fused agglomerated powder under an electron microscope shows that one particle is bonded to another and that the individual particles in the composites are more rounded than prior to agglomeration. When a conventional powder coating composition is inspected under an electron microscope, however, the powder particles are seen to be sharp-edged or angular, and are seen as separate, distinct particles—they are not fused to one another.

Furthermore, unlike conventional uniformly coloured powder coating compositions, that contain particles of only a single colour (produced by fusion in the melt extruder), powder coating compositions of this invention consist of a mixture of differently coloured particles and uncoloured particles but nevertheless give the appearance of a single colour on application to a substrate.

An agglomerated powder coating composition according to the invention may in principle be applied to a substrate by any suitable process of powder coating technology, for example by electrostatic spray coating, or by fluidised-bed or electrostatic fluidised-bed processes.

After application of the powder coating composition to a substrate, conversion of the resulting adherent particles into a continuous coating (including, where appropriate, curing of the applied composition) may be effected by heat treatment and/or by radiant energy, notably infra-red, ultra-violet or electron beam radiation.

The powder is usually cured on the substrate by the application of heat (the process of stoving), usually for a period of from 5 to 30 minutes and usually at a temperature in the range of from 150 to 220° C., although temperatures down to 90° C. may be used for some resins, especially epoxy resins; the powder particles melt and flow and a film is formed. The curing times and temperatures are interdependent in accordance with the composition formulation that is used, and the following typical ranges may be mentioned:

| Temperature/° C. | Time |
|---|---|
| 280 to 100° | 10 s to 40 min |
| 250 to 150 | 15 s to 30 min |
| 220 to 160 | 5 min to 20 min |

Temperature down to 90° C. may be used for some resins, especially certain epoxy resins.

The invention also provides a process for forming a coating on a substrate, which comprises applying an agglomerated composition according to the invention to a substrate, for example by an electrostatic spray coating process, and heating the applied composition to melt and fuse the particles and where appropriate cure the coating.

The film may be any suitable thickness. For decorative finishes, film thicknesses as low as 20 microns should be mentioned, but it is more usual for the film thickness to fall within the range 25–120 microns, with common ranges being 30–80 microns for some applications, and 60–120 microns or, more preferably, 60–100 microns for other applications, while film thicknesses of 80–150 microns are less common, but not rare.

The substrate may comprise a metal, a heat-stable plastics material, wood, glass, or a ceramic or textile material. Advantageously, a metal substrate is chemically or mechanically cleaned prior to application of the composition, and is preferably subjected to chemical pre-treatment, for example with iron phosphate, zinc phosphate or chromate. Substrates other than metallic are in general preheated prior to application or, in the case of electrostatic spray application, are pretreated with a material that will aid such application.

The following Examples illustrate the invention. In each case the particle sizes were measured on the Malvern Mastersizer X laser light-scattering device from Malvern Instruments.

EXAMPLES

Preparation of Individual Components

White, black and red coloured film-forming base components and different uncoloured film-forming components were prepared by mixing the following formulations.

| Component A - White Powder Coating Composition | |
|---|---|
| Rutile titanium dioxide white pigment | 600 g |
| Carboxylic acid-functional polyester resin | 360 g |
| Bis(beta-hydroxyalkylamide) curing agent | 13 g |
| Benzoin degassing agent | 4 g |
| Flow modifiers | 18 g |
| Surface waxes | 5 g |
| Component B - Black Powder Coating Composition | |
| Carbon Black pigment | 175 g |
| Carboxylic acid-functional polyester resin | 772 g |
| Bis(betahydroxyalkylamide) curing agent | 27 g |
| Benzoin degassing agent | 4 g |
| Flow modifiers | 18 g |
| Surface waxes | 4 g |
| Component C - Red Powder Coating Composition | |
| Earth Red iron oxide pigment | 125 g |
| Carboxylic acid-functional polyester resin | 650 g |
| Bis(beta-hydroxyalkylamide) curing agent | 24 g |
| Benzoin degassing agent | 2 g |
| Flow modifiers | 18 g |
| Surface waxes | 4 g |
| Fillers (barytes) | 177 g |

For the coloured components A to C the ingredients were dry mixed and fed to an extruder blender operating at a temperature of 100° C. The extruder produced a sheet of pigmented resin which was ground to a particle size of below 100 μm and milled on a 100 AFG jet-mill (manufacturer Hosakawa Micron) at 6 Bar grinding air pressure and classified at a speed of 7000 rpm.

The particle size distribution for Components A, B and C was:

Dv.50=3.5 μm

Dv.90=5.9 μm

Dv.99=8.2 μm

The polyester of Components A to C had an acid value of 18 to 30.

| Component D - Uncoloured Powder Coating Composition | |
|---|---|
| Carboxylic acid-functional polyester resin | 650 g |
| Bis(beta-hydroxyalkylamide) curing agent | 24 g |
| Benzoin degassing agent | 2 g |
| Flow modifiers | 18 g |
| Surface waxes | 4 g |
| Fillers (barytes) | 302 g |
| Component E - Uncoloured Powder Coating Composition for gloss-reduction | |
| Carboxylic acid-functional polyester resin | 575 g |
| Fillers (barytes) | 333 g |
| Benzoin degassing agent | 4 g |
| Surface waxes | 4 g |
| Flow modifiers | 18 g |
| Bis(beta-hydroxyalkylamide) curing agent | 65 g |

For uncoloured components D and E the procedure for components A to C was repeated except that the jet-milling was carried out at 3000 rpm.

The particle size distribution for components D and E is:

Dv.50=18.4 μm

Dv.90=36.2 μm

Dv.99=51.0 μm

The polyester of Component D had an acid value of 18 to 30 and the polyester of Component E had an acid value of 40 to 90.

| Component F - Uncoloured Powder Coating Composition for Texturing | |
|---|---|
| Carboxylic acid-functional polyester resin | 780 g |
| Texturing agent: (PTFE wax, silicone wax, cellulose acetyl butyrate, ester modified polyether | 220 g |

The ingredients were dry mixed and fed to an extruder blender operating at a temperature of 100° C. This was ground to a powder in an air classified impact mill.

The particle size distribution for component F is

Dv.50=36 μm

Dv.90=82 μm

Dv.99=118 μm

The polyester of Component F had an acid value of 18 to 30.

| Component G - Uncoloured Powder Coating Composition for Pearlescent Effects | |
|---|---|
| Component E | 800 g |
| Mica Pigment (e.g. Iriodin 9111 supplied by Merck Ltd.. Poole, Dorset, England) | 200 g |

The ingredients were blended together in a Henschel FM10 mixer for 30 minutes in total, taking the temperature to 54° C. The agglomerated powder was sieved through a 110 μm steel mesh.

The particle size distribution for component G is

Dv.50=13 μm

Dv.90=24 μm

Dv.99=38 μm

Components H and I

Components A and B were prepared as before but milled on a 100 AFG jet-mill at 6 Bar grinding air pressure and classified at a speed of 12000 rpm. These components were re-labelled Components H and I respectively.

The particle size distribution for Components H and I were:

Dv.50=2.6 μm

Dv.90=5.3 μm

Dv.99=6.4 μm

| Component J - Uncoloured Powder Coating composition for Tribo Application | |
|---|---|
| Carboxylic acid-functional polyester resin | 875 g |
| Bis-(beta-hydroxyalkylamide) curing agent | 50 g |
| Benzoin degassing agent | 2 g |
| Flow modifier | 26 g |
| Tribostatic additives | 47 g |

The ingredients were dry mixed and fed to an extruder blender operating at a temperature of 100° C. The extruder produced a sheet of uncoloured resin which was ground to a particle size of below 100 μm and milled on a 100 AFG jet-mill (manufacturer Hosakawa Micron) at 6 Bar grinding air pressure and classified at a speed of 6500 rpm.

The particle size distribution for Component J is

Dv.50=5.3 μm

Dv.90=8.2 μm

Dv.99=9.4 μm

The polyester of component J had an acid value of 18 to 30.

| Component K - Uncoloured Powder Coating Composition (Polyester/Epoxy) | |
|---|---|
| Carboxylic acid-functional polyester resin | 440 g |
| Glycidyl-functional Bisphenol-A epoxy resin (type II or type III epoxy) | 290 g |
| Benzoin degassing agent | 2 g |
| Flow modifiers | 18 g |
| Fillers (barytes) | 250 g |

The ingredients were dry mixed and fed to an extruder blender operating at a temperature of 100° C. This was ground to a powder in an air classified impact mill.

The particle size distribution for component K is

Dv.50=28 μm

Dv.90=58 μm

Dv.99=72 μm

The polyester of Component K had an acid value of 18 to 30.

Preparation and Use of Agglomerated Powder Coating Compositions

Example 1

A mixture comprising:

| Component A | 187.5 g |
|---|---|
| Component B | 16.7 g |
| Component C | 100.0 g |
| Component D | 695.8 g | was blended together in a Henschel FM10 mixture for 30 minutes in total, with a water jacket taking the temperature to 54° C. The agglomerated powder was sieved through a 110 μm steel mesh and then electrostatically applied through a Gema PCG-1 corona spray gun onto an aluminium Q panel. This was then stoved at the recommended time and temperature.

A smooth, glossy coating that had a homogeneous dusky pink colour was produced.

Example 2

A mixture comprising

| Component A | 187.5 g |
|---|---|
| Component B | 16.7 g |
| Component C | 100.0 g |
| Component D | 545.8 g |
| Component E | 150.0 g | was agglomerated and applied to a substrate and stoved as in Example 1.

As shown by their acid numbers. the polyester of Component E has a different functionality and hence different gel time from components A to D, and a smooth, matt coating of 30% gloss at 60° angle is produced that has a homogeneous dusky pink colour.

Example 3

A mixture comprising

| Component A | 65 g |
|---|---|
| Component B | 75 g |
| Component C | 80 g |
| Component D | 760 g |
| Component F | 20 g | was blended together in a Henschel mixer for 30 minutes in total, taking the temperature to 54° C. The agglomerated powder was sieved through a 100 μm steel mesh and then electrostatically applied through a Gema PCG-1 corona spray gun onto an aluminium Q Panel. This was then stoved at the recommended time and temperature.

A textured, glossy coating that had a homogeneous dark brown colour was produced.

Example 4

A mixture comprising

| Component A | 250 g |
|---|---|
| Component B | 125 g |
| Component D | 475 g |
| Component G | 150 g | was blended together in a Henschel mixer for 30 minutes in total, taking the temperature to 54° C. The agglomerated powder was sieved through a 110 μm steel mesh and then electrostatically applied through a Gema PCG-1 corona spray gun onto an aluminium Q Panel. This was then stoved at the recommended time and temperature.

A smooth, matt coating that had a homogeneous grey colour and a pearlescent metallic effect was produced.

Example 5

A mixture comprising

| | |
|---|---|
| Component H | 40 g |
| Component I | 120 g |
| Component D | 670 g |
| Component E | 70 g |
| Component J | 100 g | was blended together in a Henschel mixer for 30 minutes in total, taking the temperature to 54° C. The agglomerated powder was sieved through a 110 μm steel mesh and then electrostatically applied by a tribostatic gun onto an aluminium Q Panel. This was then stoved at the recommended time and temperature.

A smooth, satin coating that had a homogeneous charcoal colour was produced.

Example 6

A mixture comprising:

| | |
|---|---|
| Component A | 187.5 g |
| Component B | 16.7 g |
| Component C | 100.0 g |
| Component K | 695.8 g | was blended together in a Henschel FM10 mixture for 30 minutes in total, with a water jacket taking the temperature to 54° C. The agglomerated powder was sieved through a 110 μm steel mesh and then electrostatically applied through a Gema PCG-1 corona spray gun onto an aluminium Q panel. This was then stoved at the recommended time and temperature.

A smooth, glossy coating that had a homogeneous dusky pink colour was produced.

What is claimed is:

1. A powder coating composition comprising composite powder particles that are an agglomerate of individual particulate components fused or bonded together, wherein the size distribution of the agglomerated particles is up to 120 μm, with a Dv.50 within the range of from 15 to 75 μm, and wherein the individual particulate components comprise
   (1) one or more colored film-forming base components having a Dv.99 of no more than 30 μm, and
   (2) one or more uncolored film-forming components, wherein at least one of the uncolored film-forming components is an uncolored film-forming component (2a) that (i) has a Dv.99 that is more than 20 μm and (ii) has a higher Dv.99 or higher Dv.50 than the one or more colored film-forming base components (1) taken together,
wherein the ratio of the one or more colored film-forming base components to the one or more uncolored film-forming components in the composition is in the range of from 1:99 to 60:40 by weight.

2. The powder coating composition of claim 1, wherein the one or more uncolored film-forming components (2a) are present in an amount of at least 10% by weight of the total film-forming components (1) and (2).

3. The powder coating composition of claim 1, wherein there is no more than 30% by weight, calculated on the weight of the total film-forming components (1) and (2), of one or more uncolored film-forming components (2b) having a Dv.99 (i) that is no higher than the Dv.99 of the one or more colored film-forming components taken together, and (ii) that is less than 20 μm.

4. A powder coating composition comprising composite powder particles that are an agglomerate of individual particulate components fused or bonded together, wherein the size distribution of the agglomerated particles is up to 120 μm, with a Dv.50 within the range of from 15 to 75 μm, and wherein the individual particulate components comprise
   (1) one or more colored film-forming base components each having a Dv.99 of no more than 30 μm, and
   (2)(a) one or more uncolored film-forming components each having a Dv.99 of more than 20 μm and each having a higher Dv.99 and/or a higher Dv.50 than the one or more colored film-forming base components (1) taken together, and, optionally,
   (b) one or more other uncolored film-forming components,
wherein the one or more colored film-forming base components (1) are present in an amount of from 1 to 60% by weight of the total film-forming components (1) and (2), the one or more uncolored film-forming components (2a) are present in a amount of from 10 to 99% by weight of the total film-forming components (1) and (2), and the one or more other uncolored film-forming components (2b) are present in an amount of up to 30% by weight of the total film-forming components (1) and (2).

5. The powder coating composition of claim 1, wherein there are two or more colored film-forming base components (1).

6. A powder coating composition comprising composite powder particles that are an agglomerate of individual particulate components fused or bonded together, wherein the size distribution of the agglomerated particles is up to 120 μm, with a Dv.50 within the range of from 15 to 75 μm, and wherein the individual particulate components comprise
   (1) two or more colored film-forming base components having a Dv.99 of no more than 30 μm, and
   (2) one or more uncolored film-forming components, wherein at least one uncolored film-forming component (2a) is a uncolored film-forming component (2a) that has a Dv.99 of more than 20 μm and that is higher than the Dv.99 of the two or more colored film-forming base components (1) taken together,
wherein the ratio of the two or more colored film-forming base components (1) to the one or more uncolored film-forming components (2) is in the range of from 1:99 to 30:70 by weight.

7. The powder coating composition of claim 6, wherein the one or more uncolored film-forming components (2a) are present in a amount of at least 10% by weight of the total film-forming components (1) and (2).

8. The powder coating composition of claim 6, wherein there is no more than 30% by weight, calculated on the weight of the total film-forming components (1) and (2), of one or more uncolored film-forming component (2b) having a Dv.99 (i) that is no higher than the Dv.99 of the colored film-forming components taken together, and (ii) that is less than 20 μm.

9. The powder coating composition of claim 1, wherein there is at least one uncolored film-forming component (2a) that has a Dv.99 of at least 30 μm.

10. The powder coating composition of claim 9, wherein there is at least one uncolored film-forming component (2a) that has a Dv.99 of at least 35 µm.

11. The powder coating composition of claim 10, wherein there is at least one uncolored film-forming component (2a) that has a Dv.99 of at least 40 µm.

12. A powder coating composition comprising composite powder particles that are an agglomerate of individual particulate components fused or bonded together, wherein the size distribution of the agglomerated particles is up to 120 µm, with a Dv.50 within the range of from 15 to 75 µm, and wherein the individual particulate components comprise
  (1) two or more colored film-forming base components having a Dv.99 of no more than 30 µm, and
  (2) one or more uncolored film-forming components, wherein at least one uncolored film-forming component is an uncolored film-forming component (2a) having a Dv.99 of more than 40 µm,
wherein, the ratio of the two or more colored film-forming base components to the one or more uncolored film-forming components is in the range of from 1:99 to 60:40 by weight.

13. The powder coating composition of claim 12, wherein the one or more uncolored film-forming components (2a) are present in an amount of at least 10% by weight of the total film-forming components.

14. The powder coating composition of claim 12, wherein there is no more than 30% by weight, calculated on the weight of the total film-forming components (1) and (2), of one or more uncolored film-forming components (2b) having a Dv.99 (i) that is no higher than the Dv.99 of the one or more colored film-forming components taken together, and (ii) that is less than 20 µm.

15. The powder coating composition of claim 1, wherein the ratio of the one or more colored film-forming base components (1) to the one or more uncolored film-forming components (2a) is in the range of from 1:99 to 50:50 by weight.

16. The powder coating composition of claim 15, wherein the ratio of the one or more colored film-forming base components (1) to the one or more uncolored film-forming components (2a) is in the range of from 1:99 to 40:60 by weight.

17. The powder coating composition of claim 16, wherein the ratio of the one or more colored film-forming base components (1) to the one or more film-forming components (2a) is in the range of from 1:99 to 30:70 by weight.

18. The powder coating composition of claim 1, wherein the ratio of the one or more colored film-forming base components (1) to the one or more uncolored film-forming components (2a) is in the range of from 5:95 to 30:70 by weight.

19. The powder coating composition of claim 1, wherein the one or more uncolored film-forming components (2) are present in an amount of at least 50% by weight of the total film-forming components (1) and (2).

20. The powder coating composition of claim 19, wherein the one or more uncolored film-forming components (2) are present in an amount of at least 60% by weight of the total film-forming components (1) and (2).

21. The powder coating composition of claim 20, wherein the one or more uncolored film-forming components (2) are present in an amount of at least 70% by weight of the total film-forming components (1) and (2).

22. The powder coating composition of claim 2, wherein the one or more uncolored film-forming components (2a) are present in an amount of at least 20% by weight of the total film-forming components.

23. The powder coating composition of claim 22, wherein the one or more uncolored film-forming components (2a) are present in an amount of at least 30% by weight of the total film-forming components.

24. The powder coating composition of claim 23, wherein the one or more uncolored film-forming components (2a) are present in an amount of at least 40% by weight of the total film-forming components.

25. The powder coating composition of claim 24, wherein the one or more uncolored film-forming components (2a) are present in an amount of at least 50% by weight of the total film-forming components.

26. The powder coating composition of claim 25, wherein the one or more uncolored film-forming components (2a) are present in an amount of at least 60% by weight of the total film-forming components.

27. The powder coating composition of claim 1, wherein there is no more than 15% by weight, calculated on the weight of the total film-forming components (1) and (2), of the one or more uncolored film-forming components (2a).

28. The powder coating composition of claim 1, wherein there are two or more compatible colored film-forming base components (1).

29. The powder coating composition of claim 1, wherein the uncolored film-forming component (2a) or at least one of the uncolored film-forming components (2) is compatible with the one or more colored film-forming base components (1) during film-formation.

30. The powder coating composition of claim 1, wherein the uncolored film-forming component (2a) or at least one of the uncolored film-forming components is incompatible with the colored film-forming base components (1) or becomes incompatible with the one or more colored film-forming base components during film-formation.

31. The powder coating composition of claim 1, wherein the one or more colored film-forming base components (1) contain a polyester.

32. The powder coating composition of claim 30, wherein the uncolored film-forming component (2a) or at least one of the uncolored film-forming components (2) contains a polyester having a different functionality from the polyester of the one or more colored film-forming base components (1).

33. The powder coating composition of claim 31, which comprises an uncolored film-forming component (2) that contains a polyester, wherein said uncolored film-forming component and the one or more colored film-forming base components (1) contain different curing agents, wherein one of the curing agents is an epoxy curing agent or a co-reactable epoxy resin.

34. The powder coating composition of claim 1, comprising an uncolored film-forming component (2) which is an agglomerate of an uncolored film-forming component fused or bonded to form a composite particles with a non-film-forming component.

35. The powder coating composition of claim 1, which comprises an uncolored film-forming component (2) that includes a texturing additive.

36. The powder coating composition of claim 34, which comprises an uncolored film-forming component (2) that includes mica.

37. The powder coating composition of claim 1, wherein there is at least one uncolored film-forming component (2a) that has a Dv.99 of no more than 90 µm.

38. The powder coating composition of claim 1, wherein there is at least one uncolored film-forming component (2a) that has a Dv.90 of at least 14 µm.

39. The powder coating composition of claim 38, wherein there is at least one uncolored film-forming component (2a) that has a Dv.90 of at least 18 µm.

40. The powder coating composition of claim 1, wherein there is at least one uncolored film-forming component (2a) that has a Dv.90 of no more than 75 μm.

41. The powder coating composition of claim 1, wherein there is at least one uncolored film-forming component (2a) that has a Dv.99 in the range of from 50 to 65 μm.

42. The powder coating composition of claim 1, wherein there is at least one uncolored film-forming component (2a) that has a Dv.50 in the range of from 5 to 45 μm.

43. The powder coating composition of claim 42, wherein there is at least one uncolored film-forming component (2a) that has a Dv.50 of at least 8 μm.

44. The powder coating composition of claim 43, wherein there is at least one uncolored film-forming component (2a) that has a Dv.99 of at least 40 μm and a Dv.50 of at least 10 μm.

45. The powder coating composition of claim 43, wherein there is at least one uncolored film-forming component (2a) that has a Dv.50 in the range of from 12 to 30 μm.

46. The powder coating composition of claim 1, wherein there is at least one colored film-forming base component (1) that has a Dv.99 in the range of from 6 to 25 μm.

47. The powder coating composition of claim 1, wherein there is at least one colored film-forming base component (1) that has a Dv.50 of no more than 18 μm.

48. The powder coating composition of claim 47, wherein there is at least one colored film-forming base component (1) that has a Dv.50 of no more than 15 μm.

49. The powder coating composition of claim 48, wherein there is at least one colored film-forming base component (1) that has a Dv.50 in the range of from 2 to 12 μm.

50. The powder coating composition of claim 1, wherein the one or more colored film-forming base components contain from 5 to 70 weight % of a pigment, calculated on the total weight of the colored film-forming base components.

51. The powder coating composition of claim 1, wherein the one or more colored film-forming base components contain from 0.5 to 50 weight % of the pigment, calculated on the total weight of the colored film-forming base components.

52. The powder coating composition of claim 1, wherein the individual particulate components of the agglomerate include on or more non-film-forming components.

53. The powder coating composition of claim 52, wherein the individual particulate components of the agglomerate include a texturing agent.

54. The powder coating composition of claim 52, wherein the one or more non-film-forming components constitute up to 50% by weight of the particulate components of the composition.

55. A kit for the preparation of powder coatings in a number of different colors comprising:
a plurality of differently colored film-forming base components, each with a Dv.99 of no more than 30 μm, and
one or more uncolored film-forming components, each having a higher Dv.99 or a higher Dv.50 than the colored film-forming base components and each Dv.99 being more than 40 μm.

56. The kit of claim 55, wherein there is at least one uncolored film-forming component that has a Dv.99 of no more than 90 μm.

57. The kit of claim 55, comprising at least 7 differently colored film-forming base components.

58. The kit of claim 55, comprising an uncolored film-forming component that is compatible during film-formation with the colored film-forming base components, and an uncolored film-forming component that is incompatible with the colored film-forming base components or that becomes incompatible with the colored film-forming base components during film-formation.

59. A kit for the preparation of powder coatings in a number of different colors comprising:
at least 7 differently colored film-forming base components,
an uncolored film-forming component that is compatible with the colored film-forming base components and remains compatible with the colored film-forming base components during film-formation and that has a Dv.99 of more than 40 μm and no more than 90 μm, and
an uncolored film-forming component that is incompatible with the colored film-forming base components or that becomes incompatible with the colored film-forming base components during film-formation and that has a Dv.99 of more than 40 μm and no more than 90 μm.

60. The kit of claim 59, comprising means for comminution of the colored film-forming base components to a powder having Dv.99 of no more than 30 μm.

61. The kit of claim 55, wherein the colored film-forming base components contain a polyester.

62. The kit of claim 55, comprising at least 3 uncolored film-forming components.

63. The kit of claim 55, comprising means for agglomerating the components to produce a fluidisable powder.

64. A process for preparing the powder coating composition of claim 1, which comprises providing the one or more colored film-forming base components (1) and the one or more uncolored film-forming components (2a) to provide a mixture of components and mixing and agglomerating the mixture of components into composite particles such that the composition is air-fluidisable and can be applied to a substrate by electrostatic spray.

65. A process for preparing the powder coating composition of claim 1 from a kit comprising a plurality of differently colored film-forming base components and one or more uncolored film-forming components having a Dv.99 of more than 40 μm, which comprises comminuting at least one of the colored film-forming base components to provide a powder having a Dv.99 of no more than 30 μm, and mixing and agglomerating the at least one comminuted colored film-forming base component and at least one uncolored film-forming component having a Dv.99 or a Dv.50 higher than the Dv.99 or Dv.50 respectively of the at least one comminuted colored film-forming base component, to form composite particles, such that the composite particles are air-fluidisable and can be applied to a substrate by electrostatic spray.

66. The powder coating composition prepared by the process of claim 64.

67. The process of forming a coating on a substrate, which comprises applying the powder coating composition of claim 1 to a substrate, and heating the applied composition to form a continuous coating.

68. A substrate coated by a process of claim 67.

* * * * *